United States Patent
Pan et al.

(10) Patent No.: US 11,548,954 B2
(45) Date of Patent: Jan. 10, 2023

(54) COMPOSITION AND METHODS FOR PREPARING HEMICELLULOSE-RICH EXTRACT FROM SPEND COFFEE GROUND

(71) Applicant: Kerry Luxembourg S.à.r.l., Luxembourg (LU)

(72) Inventors: Li Pan, Rockton, IL (US); Rajesh Potineni, Roscoe, IL (US); Yingshuang Lu, Valencia, CA (US); Peter Lee, Middleton, WI (US); John Kailemia Muchena, Roscoe, IL (US); Celia Chee, Roscoe, IL (US)

(73) Assignee: Kerry Group Services International Limited, Tralee (IE)

( * ) Notice: Subject to any disclaimer, the term of this patent is extended or adjusted under 35 U.S.C. 154(b) by 0 days.

(21) Appl. No.: 16/689,430

(22) Filed: Nov. 20, 2019

(65) Prior Publication Data

US 2021/0017299 A1  Jan. 21, 2021

Related U.S. Application Data

(60) Provisional application No. 62/874,063, filed on Jul. 15, 2019.

(51) Int. Cl.
*C08B 37/00* (2006.01)

(52) U.S. Cl.
CPC ...... *C08B 37/0003* (2013.01); *C08B 37/0057* (2013.01)

(58) Field of Classification Search
CPC ..................................................... C08B 37/00
See application file for complete search history.

(56) References Cited

U.S. PATENT DOCUMENTS 4,806,475 A  2/1989  Gould

FOREIGN PATENT DOCUMENTS

| CA | 2 283 656 C | | 9/1998 | |
| CN | 201510402124 A | * | 11/2015 | |
| JP | 03015364 A | * | 1/1991 | ....... C03B 37/01217 |

OTHER PUBLICATIONS

Ferreira et al ("Characterization of fiber modified spent coffee grounds for treatment with alkaline hydrogen peroxide", Colloque Scientifique International sur le Cafe (2012), 24th, 397-401, 5 pp.) (Year: 2012).*
Luisa Cruz-Lopes et al., "A New Way of Using Spent Coffee Ground", Agriculture & Food, ISSA 1314-8591, Journal of International Scientific Publications, 2017, pp. 85-95, vol. 5.
Lina F. Ballesteros, "Characterization of polysaccharides extracted from spent coffee grounds by alkali pretreatment," Carbohydrate Polymers, 2015, pp. 347-354, vol. 127.
Ali Alghooneh et al., "Characterisation of cellulose from coffee silverskin", International Journal of Food Properties, 2017, pp. 2830-2843, vol. 20, No. 11.
Rocio Campos-Vega et al., "Spent coffee grounds: A review on current research and future prospects", Trends in Food Science & Technology, 2015, pp. 24-36, vol. 45.

* cited by examiner

*Primary Examiner* — Leigh C Maier
*Assistant Examiner* — Everett White
(74) *Attorney, Agent, or Firm* — Sughrue Mion, PLLC

(57) ABSTRACT

Methods of preparing a hemicellulose-product and a holocellulose-product from a carbohydrate-rich material, including spend coffee grounds, are described. Hemicellulose-products and holocellulose-products produced according to these methods are also described.

22 Claims, 5 Drawing Sheets

FIG. 3C

|  |  | Peak 1 | Peak 2 |
|---|---|---|---|
| SCGH[a] | Mass Fraction | 93.9% | 6.1% |
|  | Mn | $3.787 \times 10^4 (\pm 3.184\%)$ | $3.957 \times 10^4 (\pm 5.955\%)$ |
|  | Mw | $1.384 \times 10^5 (\pm 3.386\%)$ | $6.459 \times 10^4 (\pm 6.153\%)$ |
|  | Mw/Mn | $3.656 (\pm 3.386\%)$ | $1.632 (\pm 8.562\%)$ |
| SCGHD[b] | Mass Fraction | 91.1% | 8.9% |
|  | Mn | $3.397 \times 10^4 (\pm 3.516\%)$ | $1.947 \times 10^4 (\pm 8.260\%)$ |
|  | Mw | $5.541 \times 10^4 (\pm 2.989\%)$ | $2.909 \times 10^4 (\pm 8.199\%)$ |
|  | Mw/Mn | $1.632 (\pm 4.166\%)$ | $1.490 (\pm 11.638\%)$ |

[a]SCG hemicellulose after AHP treatment
[b]SCG Defatted hemicellulose after AHP treatment

COMPOSITION AND METHODS FOR PREPARING HEMICELLULOSE-RICH EXTRACT FROM SPEND COFFEE GROUND

CROSS REFERENCE TO RELATED APPLICATIONS

This patent application claims the benefit of U.S. Provisional Patent Application No. 62/874,063, filed Jul. 15, 2019, the entire teachings and disclosure of which are incorporated herein by reference thereto.

BACKGROUND

Coffee is one of the most widely consumed beverages in the world and the second largest traded commodity worldwide after petroleum. Spend coffee grounds (SCG) have been generated as a byproduct during the process of brewing roasted coffee beans. The huge amount of spent coffee waste produced in the coffee industry requires a waste management plan according to existing national regulations, with most spend coffee waste being dumped in landfills, or, in a very limited way, used in composting, gardening, and bioenergy production.

SCG mainly contains carbohydrates (~50%), lipid and fat compounds (7-29%), nitrogen containing compounds (8.5-13.6%), which include proteins and non-protein compounds, phenolic compounds (1-1.5%), as well as minerals (~1.6%). Among the carbohydrates, hemicellulose, mainly constituted by galactose, arabinose, and mannose, is the major component, corresponding to over 30% (w/w). Hemicellulose together with cellulose and lignin associated compounds are the major biomass in coffee spend and correspond to almost half of the material dry weight.

Extraction of hemicellulose from SCG faces two significant challenges. First, in the cell wall, hemicellulose forms hydrogen bonds with cellulose, covalent bonds with lignin, and ester bonds with acetyl units and hydroxycinnamic acids. These linkages prevent hemicellulose from effectively being extracted by water or other solvents. Second, the hemicellulose must be clean, less colored, and lack the smoky flavors and aromas associated with roasted coffee beans for extensive usage of soluble hemicellulose as well as insoluble holocellulose. Thus, an effective pretreatment method that can increase the efficiency of the extraction as well as subsequent steps that target color and odor removal should be implemented in a successful strategy of recycling the carbohydrates from SCG.

Published pretreatment methods of SCG can be classified into physical, chemical, biological and combinations of different actions, such as ultra-sonication, steam explosion, ammonia fiber explosion (AFEX), ozonolysis, anaerobic co-digestion, enzyme hydrolysis, acid hydrolysis, and alkaline hydrolysis. One of the most conventional methods for pretreatment of SCG for delignification to produce holocellulose utilizes a mixture of sodium chlorite and acetic acid as an oxidation method. However, sodium hypochlorite solutions combined with acid produce toxic chlorine dioxide, which is harmful to humans and the environment.

Among these pretreatment methods, the inventors determined that alkaline hydrogen peroxide combination treatment (referred to herein as AHP treatment) is effective for both delignification and solubilization of hemicelluloses from SCG. In alkaline solution, hemicellulose is liberated from the lignocellulosic matrix by hydrolysis of the ester linkages. By adding hydrogen peroxide in alkaline media, principal active species, such as hydroperoxide anion ($HOO^-$), hydroxyl radicals ($HO\cdot$), and superoxide anion radicals ($O\cdot^-_2$) are formed, which cause the oxidation of lignin structures, leading to the introduction of hydrophilic (carboxyl) groups, cleavage of interunit bonds, and eventually dissolution of lignin and hemicelluloses. This process can be carried out under relatively mild conditions, using less corrosive chemicals, less cost and less polluting.

More recently, the AHP method has been used in the process of isolation and purification of only insoluble holocellulose from coffee silver skin (Alghooneh, et al., (International Journal of Food Properties, 2017, VOL. 20, NO. 11, 2830-2843), and SCG (Luísa Cruz-Lopes 1, et al., Agriculture & Foods, 2017, vol 5, 85-93) for academic analysis purposes. In both studies, the authors targeted the delignified and decolored water insoluble holocellulose, which mainly consisted of cellulose, while the majority of hemicellulose that was extracted and dissolved in the alkaline solution was discarded as waste and was not purified and recycled.

The use of AHP pretreatment combined with subsequent membrane filtration and ethanol precipitation as disclosed herein to recycle water soluble hemicellulose from coffee spend for food applications has not previously been practiced in the art. The present disclosure provides new methods for the extraction and isolation of SCG derived water-soluble hemicellulose. By using the disclosed methods, a water soluble hemicellulose rich extract, which accounts for about 16-30% (w/w), together with the water insoluble, delignified and decolored cellulose, which accounts for about 25-35% (w/w), can be recycled from the SCG. The resulting hemicellulose and cellulose are obtained in high yield and high quality, which guarantee their great application potentials in the food industry and related fields.

FIGURES

FIGS. 3A-3C depict weight-average molecular weight (Mw), number-average molecular weight (Mn), and polydispersity (Mw/Mn) of hemicellulose and defatted hemicellulose fractions isolated from SCG after AHP treatment.

OVERVIEW

Figure 1:
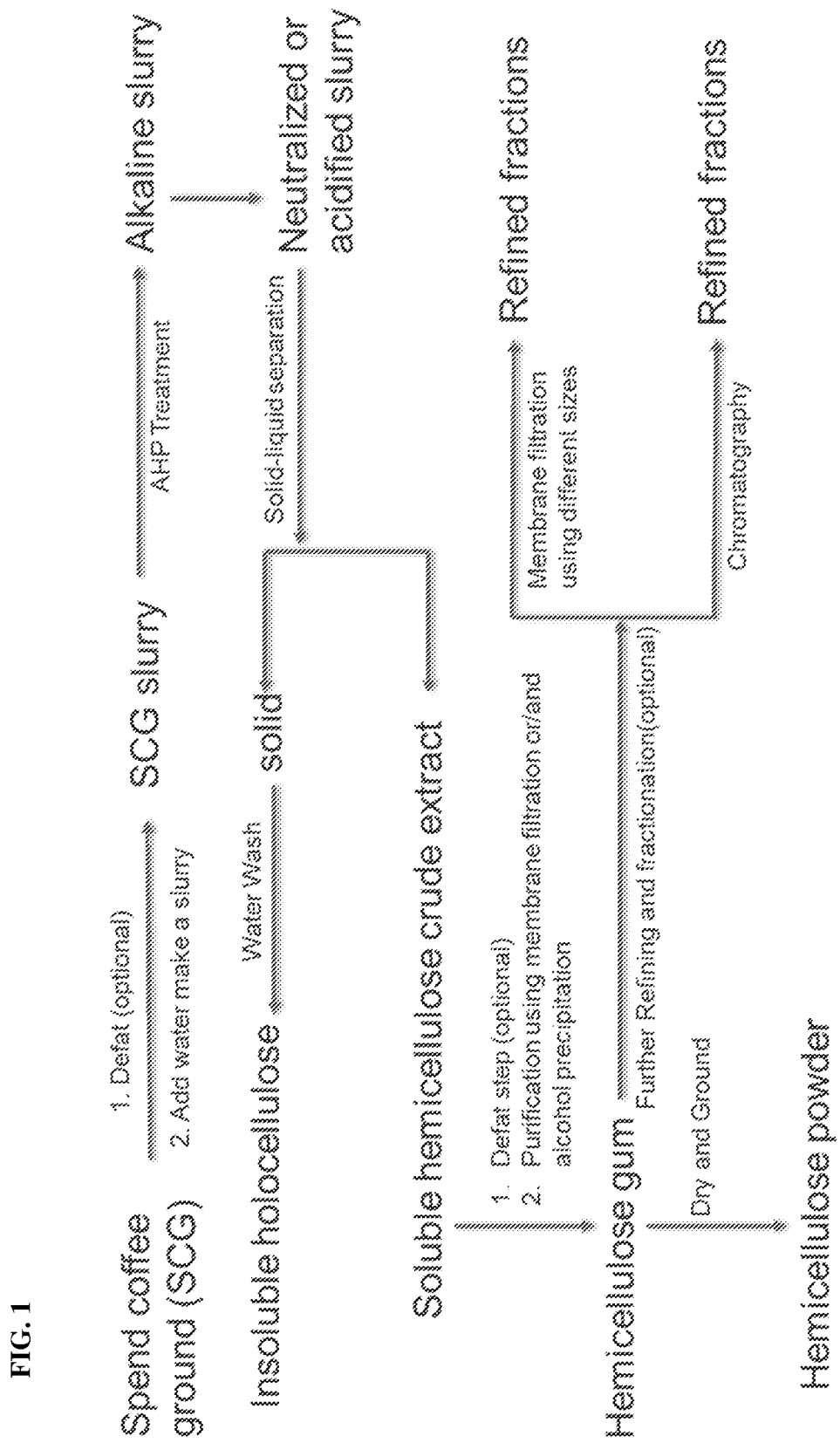
FIG. 1 is a flow chart depicting an embodiment of the invention.

Non-limiting embodiments of the disclosure provide an environment friendly, industry practicable, and highly efficient method to recycle hemicellulose and cellulose from SCG. The resultant hemicellulose powder is brown in color, stable, and highly soluble in water. The hemicellulose powder has mouthfeel taste, lacks odor and aroma, and can be used as a food additive as a snack filling, seasoning carrier, sustainable film, or coating. The hemicellulose powder has the potential to be integrated in a wide variety of applications, including as thickeners, film-former substances, emulsifiers, binders, stabilizers, carriers, and coatings. The hemicellulose powder can also be used in beverages for off-note and bitterness masking as well as mouthfeel enhancement. In addition, the hemicellulose powder has potential medical and pharmaceutical applications, including immune regulation, bacteria inhibition, and drug delivery.

Non-limiting embodiments of the disclosure relate to processes to produce high yields of hemicellulose from SCG by alkaline extraction combined with hydrogen peroxide treatment (AHP treatment), followed with acidification, membrane filtration, and ethanol precipitation. In addition, membrane filtration and macroporous resin chromatography can be used for further refining and fractionation of the obtained hemicellulose.

The disclosed methods may be used on many carbohydrate-rich food industry by-products and wastes to obtain water-soluble hemicellulose and decolored and delignified water insoluble cellulose at high yield and quality, providing an efficient and practicable way for food industry waste recycling.

Embodiments of the disclosure improve upon the conventional art by providing environment friendly methods to isolate high quality hemicellulose from food industry waste with a high yield of about 15-30% (w/w). This method not only produces water soluble hemicellulose, but also a decolored, delignified water-insoluble holocellulose, with a high yield of about 20-35% (w/w), both of which are valuable products derived from coffee waste.

The AHP method is more widely used in the paper industry and is very rare in the food industry. Although SCG contains around 50% of carbohydrates, with hemicellulose as one of the most abundant constituents, SCG has not been regarded as an ideal and obvious resource for hemicellulose. The major reason is that the recalcitrant nature of the coffee cell wall makes extraction of the hemicellulose very challenging. Moreover, since SCG have been roasted, the dark color, strong smoky and coffee notes prevent people from considering hemicellulose from SCG as being ideal for extensive application.

By exploring different strategies to recycle coffee waste, the inventors of the present application determined that AHP pretreatment not only extracts hemicellulose efficiently, but also reduces the color and smoky notes inherent in the raw material by strong oxidative reaction. After the AHP pretreatment, the hemicellulose fraction extracted in the AHP solution is mixed with degraded molecules having dark brown color and off-note, which affects the quality of the hemicellulose. To purify the hemicellulose, the alkaline solution is neutralized with acid and subsequently subjected to membrane filtration and ethanol precipitation to yield a light-colored, clean-tasting hemicellulose gum. This is the first time that such high yield and high quality hemicellulose has been successfully extracted and isolated from SCG by using this method. This invention provides a high efficiency, low cost, and practical method to recycle spend coffee grounds as well as related food industry by-products.

Non-limiting embodiments of the disclosure include as follows:

[1] A method of producing a hemicellulose product, the method comprising: combining an aqueous slurry of a carbohydrate-rich material with an alkaline hydrogen peroxide solution; separating a solid fraction from a liquid fraction of the alkaline hydrogen peroxide treated slurry; adjusting the pH of the liquid fraction to a pH between about 4.0-6.0 using a pH adjusting agent; combining an alcohol solution with the pH adjusted liquid fraction so as to precipitate a hemicellulose product; and drying the hemicellulose product.

[2] The method according to [1], wherein the carbohydrate-rich material is spend coffee grounds.

[3] The method according to [2], further comprising a step of defatting the aqueous slurry by adding an organic solvent to the aqueous slurry prior to the step of adding an alkaline hydrogen peroxide solution.

[4] The method according to [2], further comprising a step of concentrating the liquid fraction.

[5] The method according to [4], wherein the concentrating step is carried out using a vacuum rotavapor.

[6] The method according to [4], wherein the concentrating step is carried out by membrane filtration.

[7] The method according to [2], further comprising a step of purifying the dried hemicellulose product.

[8] The method according to [7], wherein the step of purifying the dried hemicellulose product comprises steps of dissolving the dried hemicellulose product in an aqueous solution and purifying the dissolved hemicellulose product by membrane filtration.

[9] The method according to [7], wherein the step of purifying the dried hemicellulose product comprises steps of dissolving the dried hemicellulose product in an aqueous solution and purifying the dissolved hemicellulose product by column chromatography.

[10] The method according to [4], further comprising a step of purifying the dried hemicellulose product.

[11] The method according to [10], wherein the step of purifying the dried hemicellulose product comprises steps of dissolving the dried hemicellulose product in an aqueous solution and purifying the dissolved hemicellulose product by membrane filtration.

[12] The method according to [10], wherein the step of purifying the dried hemicellulose product comprises steps of dissolving the dried hemicellulose product in an aqueous solution and purifying the dissolved hemicellulose product by column chromatography.

[13] The method according to [4], further comprising a defatting step by adding an organic solvent to the concentrated pH adjusted solution prior to the step of precipitating the hemicellulose product.

[14] The method according to [4], further comprising: dissolving the precipitated hemicellulose product in an aqueous solution; adding an organic solvent to the hemicellulose aqueous solution so as to remove fat from the solution; and drying the defatted hemicellulose product.

[15] The method according to [2], further comprising a step of washing the solid fraction to produce a holocellulose product.

[16] The method according to [1], wherein ethanol is the alcohol solution combined with the pH adjusted liquid fraction to precipitate the hemicellulose product.

[17] A method of producing a hemicellulose product, the method comprising: combining an aqueous slurry of spend coffee grounds with an alkaline hydrogen peroxide solution; separating a solid fraction from a liquid fraction of the alkaline hydrogen peroxide treated slurry; concentrating the liquid fraction by membrane filtration. adjusting the pH of the concentrated liquid fraction to a pH between about 4.0-6.0 using a pH adjusting agent; precipitating a hemicellulose product by adding ethanol to the pH adjusted solution; and drying the hemicellulose product.

[18] A hemicellulose product produced according to the method of [2].

[19] A hemicellulose product produced according to the method of [10].

[20] A holocellulose product produced according to the method of [15].

[21] A hemicellulose product produced according to the method of [17].

[22] The hemicellulose product of [18], having a molecular weight of about at least 2 kDa to about 200 kDa.

[23] The hemicellulose product of [22], comprising galactose in an amount of about 62%-94%, arabinose in an amount of about 9%-14%, and mannose in an amount of about −3.3%-5.1%.

[24] A hemicellulose product comprising galactose in an amount of about 62%-94%, arabinose in an amount of about 9%-14%, and mannose in an amount of about −3.3%-5.1% and having a molecular weight in a range of about at least 2 kDa to about 200 kDa.

DETAILED DESCRIPTION OF NON-LIMITING EMBODIMENTS OF THE DISCLOSURE

Non-limiting embodiments of the disclosure relate to methods for producing high yield and high quality hemicellulose from SCG. In certain embodiments, the methods provide a percent yield of about 16-30% (w/w) of hemicellulose, as well as about 25-35% (w/w) of cellulose based on SCG dry weight.

Figure 2:
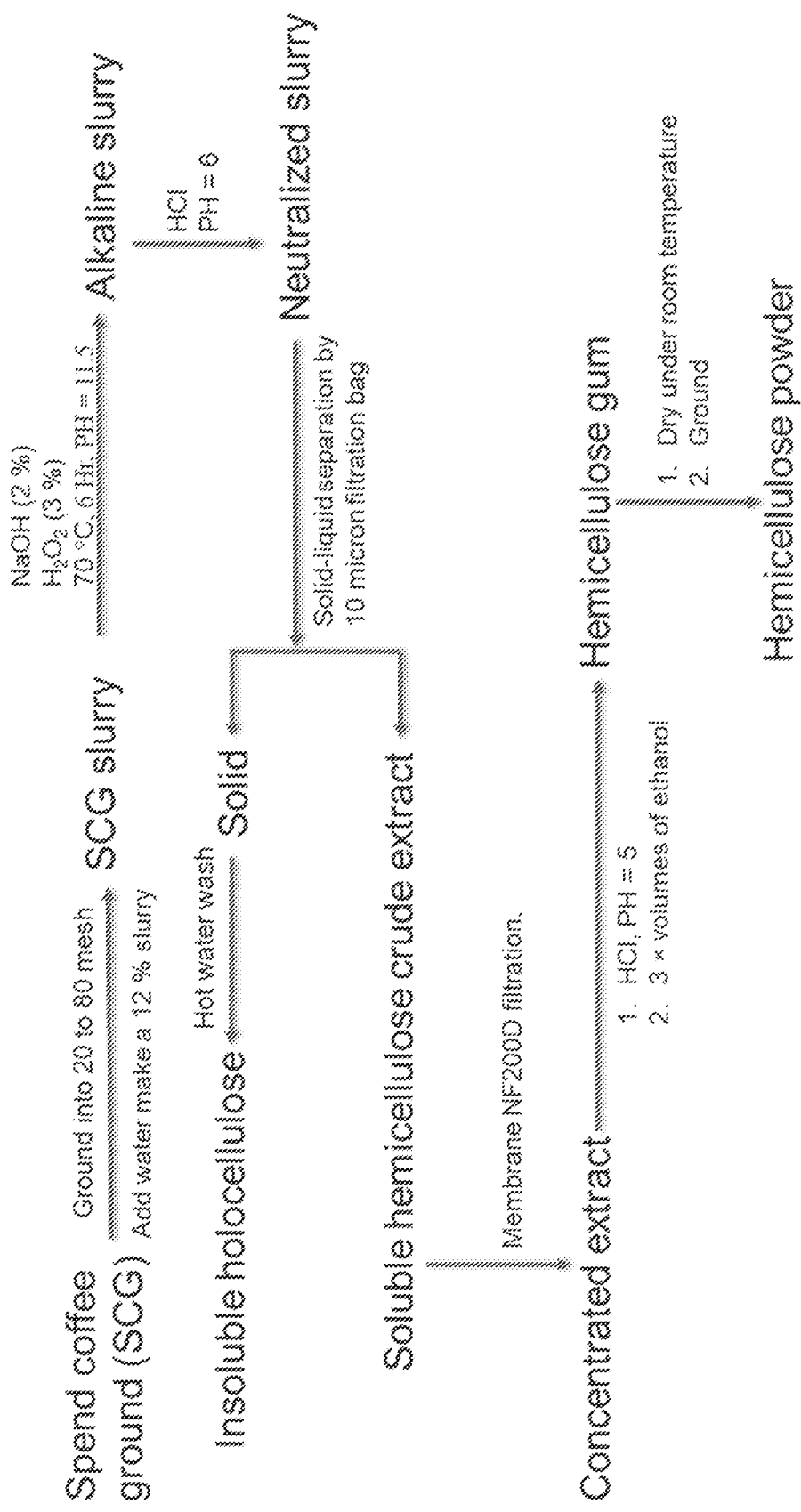
FIG. 2 is a flow chart depicting an embodiment of the invention.

FIGS. 1 and 2, discussed below, provide exemplary flow charts of embodiments of the disclosure.

FIG. 1 depicts a process of the disclosure for producing hemicellulose from coffee spend 1) SCG is ground into small particles, with the major particle sizes ranging from about 0.15 mm to 2 mm. In one embodiment, an optional step is performed wherein the ground particles are extracted by a solution of ethanol and water for a duration of time to remove lipophilic and hydrophilic components. Various concentrations of ethanol aqueous solutions can be used. In certain embodiments, these solutions may contain about 40-95% ethanol and about 5-60% water. In one exemplary embodiment, the solution can contain about 60% ethanol and about 40% water. The extraction typically is carried out over a period of about 4-12 hours. In one exemplary embodiment, extraction is carried out for about 6 hours. The extraction step is preferably carried out at temperatures in the range of about 25-80° C. In one embodiment, the extraction is carried out at around 60° C. The extraction can be repeated 2 to 4 times. In one embodiment, the extraction is repeated 3 times. The ethanol aqueous extraction is optional. In one embodiment, the extraction is omitted.

2) The SCG from step 1) is suspended in water to make a slurry having a concentration of around 5 to 15% (w/w). In certain embodiments, the slurry can have a concentration of solids in the range of about 15-20% (w/w). In other embodiments, the slurry can have a concentration of about 8-12% (w/w).

3) Sodium hydroxide (NaOH) is added to the slurry in an amount to provide a final pH in the range of about 10-12. For example, in certain embodiments, sodium hydroxide is added in an amount of about 1-4% (w/w, based on the slurry weight), at a temperature of about 60-80° C.

4) Hydrogen peroxide ($H_2O_2$) is added to the slurry after 0-4 hours alkaline treatment. For example, in certain embodiments, sodium hydroxide is added after 2 hours of alkaline treatment. The amount of hydrogen peroxide can be added in an amount of around 1-5% (w/w, based on the slurry weight). In other embodiments, hydrogen peroxide is added in an amount of around 3% (w/w, based on the slurry weight).

5) The slurry from step 4) is stirred at a temperature for a duration of time. In certain embodiments, the slurry is stirred at a temperature in the range of about 40° C.-80° C. In other embodiments, the slurry is stirred at 60° C. In certain embodiments, the slurry is stirred for a duration of about 4-6 hours. In other embodiments, the slurry is stirred for about 6 hours.

6) After stirring, the slurry can be processed to separate the resultant soluble and insoluble fractions. In certain embodiments, the slurry is filtered to separate soluble and insoluble fractions. As one example, the filtering can be performed using a 100 mesh sieve. Centrifugation can be performed by decanter centrifuge or disc centrifugation and the supernatant collected. The slurry can be subjected to centrifugation for the separation at, for example, 4500 rpm for 12 minutes. The collected insoluble fraction includes the insoluble holocellulose from the coffee spend; the soluble fraction contains crude hemicellulose. The insoluble holocellulose is collected and washed by water, until the waste water becomes substantially clear. Then the cleaned holocellulose is dried. Drying can be performed by different means, such as baking in an oven at a temperature in the range of, for example, about 50-80° C. for about 8-24 hours. Drying can also be performed by maintaining the holocellulose fraction at room temperature until dry. The resultant holocellulose is white or pale yellow in color, without any smoky and coffee aroma.

7) The pH of the recovered crude hemicellulose supernatant is subsequently adjusted with a pH adjusting agent. In certain embodiments, the pH of the supernatant is adjusted to a range of about 6.0-7.0. Hydrochloric acid (HCl) is one exemplary pH adjusting agent. In certain embodiments, the pH is adjusted to about 6.0.

8) The neutralized hemicellulose extraction is subsequently filtered using a nanofiltration membrane so as to concentrate the solution as well as remove small molecules and salts. In one embodiment, the nanofiltration membrane has a molecular weight cutoff (MWCO) of 200 Da. Besides membrane filtration, in one embodiment, the step of concentrating is achieved by means of a vacuum rotavapor. Other exemplary means could include distillation. Vacuum rotavapor and distillation methods do not remove salt and small molecules, which are removed by use of the nanofiltration membrane. Through concentration an amount of water is removed. In certain embodiments, about 70-80% water is removed. In other embodiments 40-60% water is removed. The resultant concentrated hemicellulose fraction has a solids concentration in the range of from about 10-20% (w/w). In certain embodiments a 15% (w/w) solids concentration is measured.

9) The pH of the concentrated hemicellulose is subsequently adjusted to a value of about 4.0-6.0 before subsequently being mixed with ethanol. In one embodiment, the pH is about 5.0. In one embodiment, 3 to 5 times volume of ethanol can be added to the concentrated hemicellulose. A defat procedure performed by using an organic solvent partition procedure prior to ethanol precipitation is optional. In one embodiment, an equal volume of ethyl acetate is added into the acidified water to remove the fat right before the step of ethanol precipitation.

10) The precipitated hemicellulose from step 9) is collected after a period of time, which in certain embodiments can be about 1-12 hours. In one embodiment, the time period is about 4 hours.

11) The hemicellulose can be washed 1-3 times in aqueous ethanol solutions with about 70-95% ethanol. For example, the hemicellulose gum can be washed in an aqueous solution of about 75% ethanol.

12) The hemicellulose gum can be dried to form a powder. In one embodiment, drying is performed at room temperature. In an alternative embodiment, drying is performed by freeze drying. In another alternative embodiment, drying is performed in a vacuum oven at about 50° C. In yet a further embodiment, drying is performed by dissolving in water and spray drying.

Alternatively, the hemicellulose gum may be subjected to further refining or fractionation procedures, as discussed below in steps 13) and 14).

13) The precipitated hemicellulose from step 10) can be dissolved in water and filtered, such as by means of an ultrafiltration membrane with MWCO between about 5-100 kDa to provide refined hemicellulose fractions. Exemplary methods of filtration include use of a membrane with MWCO of 5 kDa, 30 kDa, 50 kDa, or 100 kDa. In one embodiment, an ultrafiltration membrane with MWCO of 5 kDa was used to obtain a retentate fraction of hemicellulose with MW range from 20 kDa to 100 kDa.

14) Alternatively, the hemicellulose from step 11) can be loaded onto a chromatographic column to yield fractions with different molecular weight distribution and less color. Exemplary chromatographic columns within the scope of the disclosure include, for example, Sepabeads® SP-70. Other exemplary chromatographic columns include macroporous adsorption resins, such as Diaion® HP20, Seplite® D101, and Seplite® AB-8, as well as size exclusion chromatography, including Sephadex™, Superdex™, Sephacryl™ and Superose™ serials. For example, a neutral macroporous resin column SP70 has been used to fractionate isolated hemicellulose into three different fractions according their molecular size and polarities, with one fraction with MW range from about 30 kDa to 200 kDa, and two fractions primarily from about 2 kDa to 10 kDa.

FIG. 2 depicts an exemplary process of an embodiment of the disclosure for producing hemicellulose from coffee spend. This embodiment depicted in FIG. 2 differs from the FIG. 1 embodiment in certain respects. In place of a rotary evaporator, a membrane filtration step is performed prior to the step of ethanol precipitation to achieve the steps of sodium removal together with concentration in one step. The inventors determined that adding this membrane filtration before ethanol precipitation removes small molecule impurities (e.g., sodium chloride) produced during the pre-treatment process and also reduces the volume of the solution, facilitating the ethanol precipitation step. This new step of combining membrane filtration and ethanol precipitation process together was found to produce a more clean product. By using this step, the sodium content has been reduced from about 5-6% (w/w) to about 2-3% (w/w), providing a product that is much less salty.

Alternative Substrates:

Alternative materials that can be used in the disclosed methods include other carbohydrate-rich materials. As used herein, carbohydrate-rich materials refer to plant-based materials having a dry weight that contains at least about 40% carbohydrates by weight. The weight % of carbohydrates can be calculated by subtracting from the total biomass weight the weights of protein, fat, ash, and moisture. By way of example, in coffee spend carbohydrates typically constitute over 60% of the dry weight of the total biomass. Additional non-limiting examples of carbohydrate-rich materials include cacao spend, pomace of citrus, grapes, apples, and other fruits after juice extraction, waste of soy beans, flaxseeds, olive fruits, grape seeds after oil and protein extraction, as well as common fruit, seed, and vegetable derived food industry by-products.

Alternative Chemical Reagents:

In the disclosed AHP treatments, certain alternative chemical reagents may be used. For example, KOH, Ca(OH)$_2$, Mg(OH)$_2$ can be used to replace NaOH; H$_2$SO$_4$, H$_3$PO$_4$ as well as organic acid, acetic acid, formic acid and citric acids, can be used to replace HCl. In the hemicellulose fractionation procedure, isopropanol can be used to replace ethanol. In the hemicellulose fractionation procedure, other neutral macroporous resins include macroporous adsorption resins including Diaion® HP20, Seplite® D101, and Seplite® AB-8, as well as size exclusion chromatography resins including Sephadex™, Superdex™, Sephacryl™ and Superose™ serials can be used to replace SP-70.

Alternative Method Steps:

The starting SCG can be wet or dry. Either ground or unground spend coffee can be used for this process, with the majority size range from 10 mesh to 100 mesh. The chemical reagents are more accessible to the fine size material, and the fine size material tends to produce high yield of hemicellulose and more light colored cellulose.

Defat extraction with organic solvent is optional. Performing the defat extraction step before AHP treatment provides comparable yield and a more clean tasting product, but does not significantly alter the fat profile, since the majority of the fat content in the final product is released from SCG after the AHP treatment. The fat can be removed more efficiently by introduction of a defat extraction step after the AHP treatment. In certain embodiments, the defat extraction step is carried out either right before the alcohol precipitation procedure, or after the precipitation, by dissolving the precipitated hemicellulose rich fraction in water, and partitioning using organic solvents, such as hexane, dichloromethane, acyl acetate or butanol.

No matter if the SCG is in dry or wet form, the final solid content in the water slurry is typically in a range from about 5 to 20% (w/w). While more water will provide better mixing of raw material with reagents, the increased volume requires more effort for the further concentration procedure of the filtrate. A desired concentration is around 12% (w/w).

The alkaline slurry is produced by adding alkalis, such as NaOH, KOH, Ca(OH)$_2$, Mg(OH)$_2$ to achieve the pH within a range of from about 10 to 12. In one embodiment, the pH is around 11.5.

Hydrogen peroxide may be either added with the base or 1 to 2 hours after alkalization of the slurry, in an amount of about 1 to 5% (w/w) based on the slurry.

The temperature of the reaction can be maintained at about 50 to 90° C. Higher temperature can shorten the reaction time and also appears to give the final product higher yield and lighter in color. The time usually lasts about 2 to 24 hours, depending on the temperature and the amount of the starting material.

When the reaction is completed, after cool down, the solids and the liquid are separated. Centrifugation by using a Beckman Coulter's Allegra X-30 benchtop centrifuge at speed of 4800 rpm, or filtration using 10 micron polypropylene felt liquid filter bag, have been employed in the lab for the separation process. Large scale separation processes may include, but are not limited to, techniques such as vacuum filtration, horizontal decanter and high speed disc centrifugation and microfiltration.

The pH of the slurry can be adjusted to be neutral or weakly acidic in the range of between 5 to 7 before separation to stabilize the hemicellulose and to facilitate the further wash step on the solid material. pH adjusting agents include HCl, H$_2$SO$_4$, H$_3$PO$_4$ as well as organic acids, such as acetic acid, formic acid and citric acid.

A hot water wash can be performed on the solid material so as to recover more solution residues and clean the solid material, which mainly contains the insoluble fibers for further application. The water wash step can be conducted several times, until the rinse water is substantially clear. During the first one or two rinses, the effluent can be combined with the separated liquid mentioned above to recover more of the soluble hemicellulose.

The solution separated from the solid material is rich with hemicellulose, but also contains ions and salts that result from the alkaline hydrogen peroxide pretreatment. Moreover, the solution has dark brown color and strong off-notes, which limits its further application. To obtain a high quality hemicellulose fraction, further purification is performed. Ethanol precipitation has been introduced for this purpose. Before ethanol precipitation, the pH of the solution is adjusted at about 4 to 6, using a pH adjusting agent, such as HCl, $H_2SO_4$, $H_3PO_4$, as well as organic acids, such as acetic acid, formic acid and citric acid.

About three volumes of ethanol may be added to the acidified solution directly, or after concentration, wherein about 60 to 80% water is removed. By adding ethanol without concentrating the acidified solution, the resultant hemicellulose gum appears more clean, with light color and less salt. However, adding ethanol without concentrating the acidified solution requires a large volume of ethanol, which increases cost and reduces efficiency for scale-up.

For carrying out the concentration step, a benchtop vacuum rotavapor has been used to remove water and make the solution 3-fold in concentration, with the total solid range from 10 to 20%. In an another embodiment, a nanofiltration membrane can be used to concentrate the acidified solution. By using nanofiltration, nearly 60 to 75% of water can be removed to concentrate the solution. Additionally, ions, salts and other organic impurities with small molecules can be separated from the large-sized hemicellulose, which improves the quality of the final product. In comparison with hemicellulose fraction concentrated using vacuum rotavapor, a hemicellulose fraction prepared using nanofiltration has less color, less salt and a clean taste.

About three volumes of ethanol may be added to the concentrated hemicellulose extract, either obtained from the vacuum rotavapor or nanofiltration. After about 2 to 12 hours, the precipitated hemicellulose gum is collected and washed with a small amount of 95% ethanol to remove liquid residues. The hemicellulose gum was dried using an oven at a temperature of about 40 to 50° C. with or without vacuum, or freeze dryer, or spay dryer after dissolving in water. Hemicellulose gum has also been dried at room temperature in a fume hood. The dried hemicellulose gum can be further grounded into powder form by a basic chopper grinder.

The purity and the yield of the resultant hemicellulose gum will be different depending on the process and conditions used. In general, the methods disclosed herein can provide a yield of from about 18 to 25% (w/w).

The resultant ranges in color vary from light brown to dark brown, depending upon the amount of $H_2O_2$ used and the purification steps adopted. The hemicellulose gum is very soluble in water, without obvious aroma and taste.

In addition, the resultant water insoluble holocellulose can been obtained from the same process, with a general yield of from about 25 to 35% (w/w). This material ranges in color from pale yellow to white, without obvious aroma and taste.

Physical and chemical properties of non-limiting embodiments of a representative hemicellulose and its derivatives produced according to methods of the disclosure have been measured and are reported in Table 1. Reasonable analytical data variation could be expected based on differences of the raw material origin and treatment conditions.

Table 2 provides the results from acid hydrolysis followed by ultra-high performance liquid chromatography coupled with a triple quadrupole mass spectrometry (UHPLC-TQMS) to measure the monosaccharide composition of the polysaccharides extracted from SCG using the methods of the disclosure. Based on this analysis, galactose and arabinose were the predominant mono sugar units, which is comparable with the composition analysis result of polysaccharides extracted from SCG using other alkaline methods. The relative abundance and yield of each monosaccharide might show certain differences based on the SCG origin and treatment conditions.

As shown in Table 1, the fat content in the hemicellulose rich extract is higher than expected, accounting for about 28.5% (w/w) of the total extract, while hemicellulose was the predominant constituent, constituting at least about 40% (w/w) of the extract. Without being bound by theory, the AHP treatment is thought to reduce the natural recalcitrance of the cell wall, significantly increasing the release of the total amount of lipids, including fatty acids, triacylglycerols and diterpene esters. The triacylglycerols and diterpene esters are further hydrolyzed by strong base and produce more fatty acids, which are then concentrated and extracted with polysaccharides and proteins together. Fat analysis revealed that linolenic acid and palmitic acid are two predominant fatty acids in the hemicellulose rich extract and account for over 75% of the total fat content.

Alternatively, a defat hemicellulose extract can be obtained by introducing an organic solvent partition process by using hexane or ethyl acetate right before alcohol precipitation, or after the precipitation, by dissolving the gum into water before organic solvent partition process The chemical and physical characters of the resulted defat hemicellulose extract (SCGHD) are also measured.

TABLE 1

Chemical composition of SCG products with and without AHP treatment[a]

|  | Average fat % | Average Ash % | Average Protein % | Average Moisture % | Minerals (in ppm) | | | | |
| --- | --- | --- | --- | --- | --- | --- | --- | --- | --- |
|  |  |  |  |  | Ca | K | Mg | Na | P |
| SCG[b] | 15.9 | 0.82 | 17.6 | 2.05 | 1062 | 2568 | 916 | 389 | 565 |
| SCGC[c] | 9.5 | 0.89 | 18.2 | 1.96 | 469 | 1417 | 144 | 3794 | 254 |
| SCGH[d] | 28.5 | 2.94 | 18.5 | 4.95 | 2215 | 1503 | 1440 | 27845 | 1364 |
| SCGHD[e] | 1.22 | 3.05 | 23.06 | 7.95 | 2156 | 2057 | 1686 | 30750 | 1676 |

[a]On a dry weight basis
[b]SCG without treatment
[c]SCG insoluble holocellulose after AHP treatment
[d]SCG hemicellulose after AHP treatment
[e]SCG defatted hemicellulose after AHP treatment

TABLE 2

Monosaccharides Composition of Polysaccharides
Prepared from SCG by AHP method

| | Monosaccharide composition (%) | | | | | | Total hydrolyzed sugar (%) |
|---|---|---|---|---|---|---|---|
| | Galactose | Arabinose | Mannose | Glucuronic A | Glucose | Ribose | |
| SCGH[a] | 75.1 | 10.6 | 5.8 | 4.2 | 3.5 | 1.0 | 40.0 |
| SCGHD[b] | 82.1 | 13.0 | 3.4 | <0.1 | 1.4 | <0.1 | 56.0 |

Figure 3A:
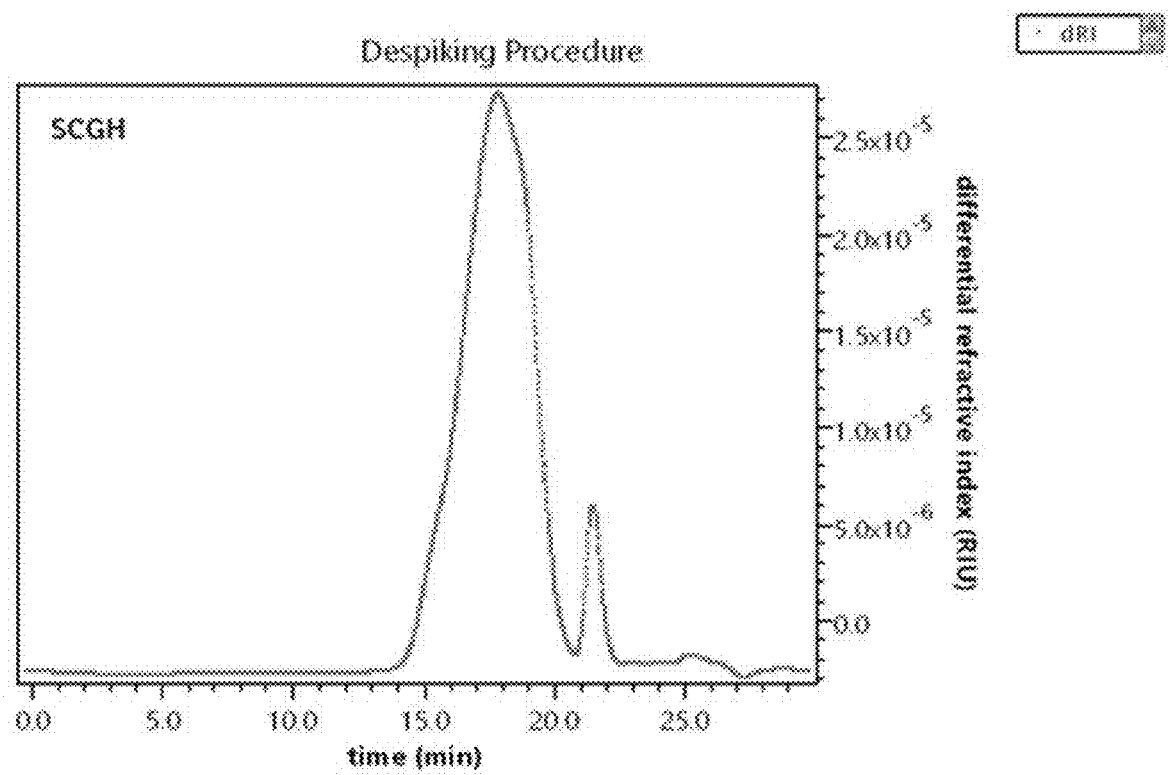
Figure 3B:
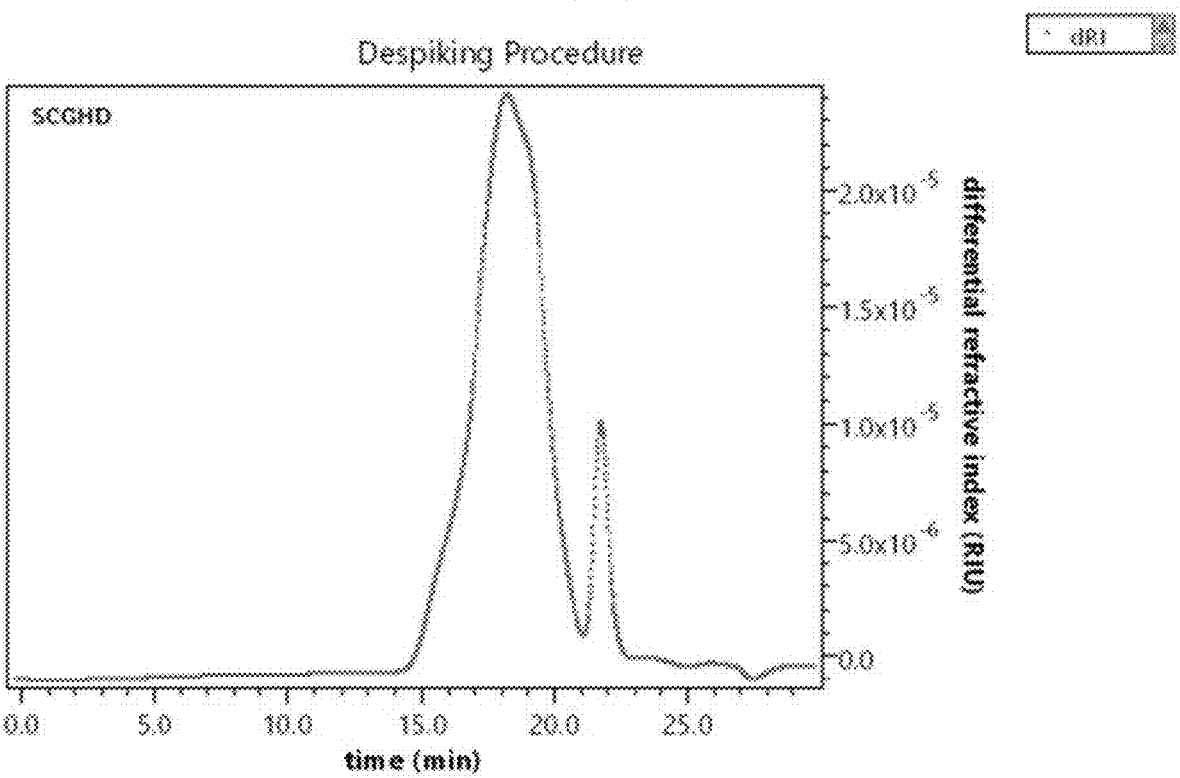

[a]SCG hemicellulose after AHP treatment
[b]SCG defatted hemicellulose after AHP treatment The weight average molecular weight (Mw) and the number-average molecular weight (Mn) as well as polydispersity (Mw/Mn) of the resultant soluble hemicellulose were determined (FIGS. 3A-3C), indicating that the hemicelluloses extracted with alkali solution contains high Mw, ranging from 20 kDa to over 100 kDa. The sugar composition and molecular size of the polysaccharides is very different from other natural derived hemicellulose, such as corn hemicellulose, which is mainly composed with arabinose and xylose, with relatively low average Mw, ranging from 2 to 4 kDa based on different extraction conditions than provided herein.

In addition, stability of the hemicellulose rich extract prepared by methods of the disclosure has been measured. Results from the thermal analysis indicate that the SCG hemicellulose rich extract and its defatted edition are both relatively stable below about 140° C. The dynamic vapor sorption (DVS) experiment indicated that both materials are stable below 65% relative humidity at 25° C., with the stability of the defatted hemicellulose rich fraction being greater than the undefatted fraction (FIG. 4).

Both defatted and undefatted hemicellulose rich fractions showed relatively high solubility in water (>20%). For the fat containing hemicellulose fraction, the lipids may interact with the polysaccharides and proteins to form an emulsion system, which allows the lipids to become well dispersed in water. The SCG derived hemicellulose rich extract has also been reported to show antimicrobial activities, especially against certain food pathogenic fungi. All of these characteristics make SCG hemicellulose an ideal polysaccharide resource for extensive applications.

Figure 4:
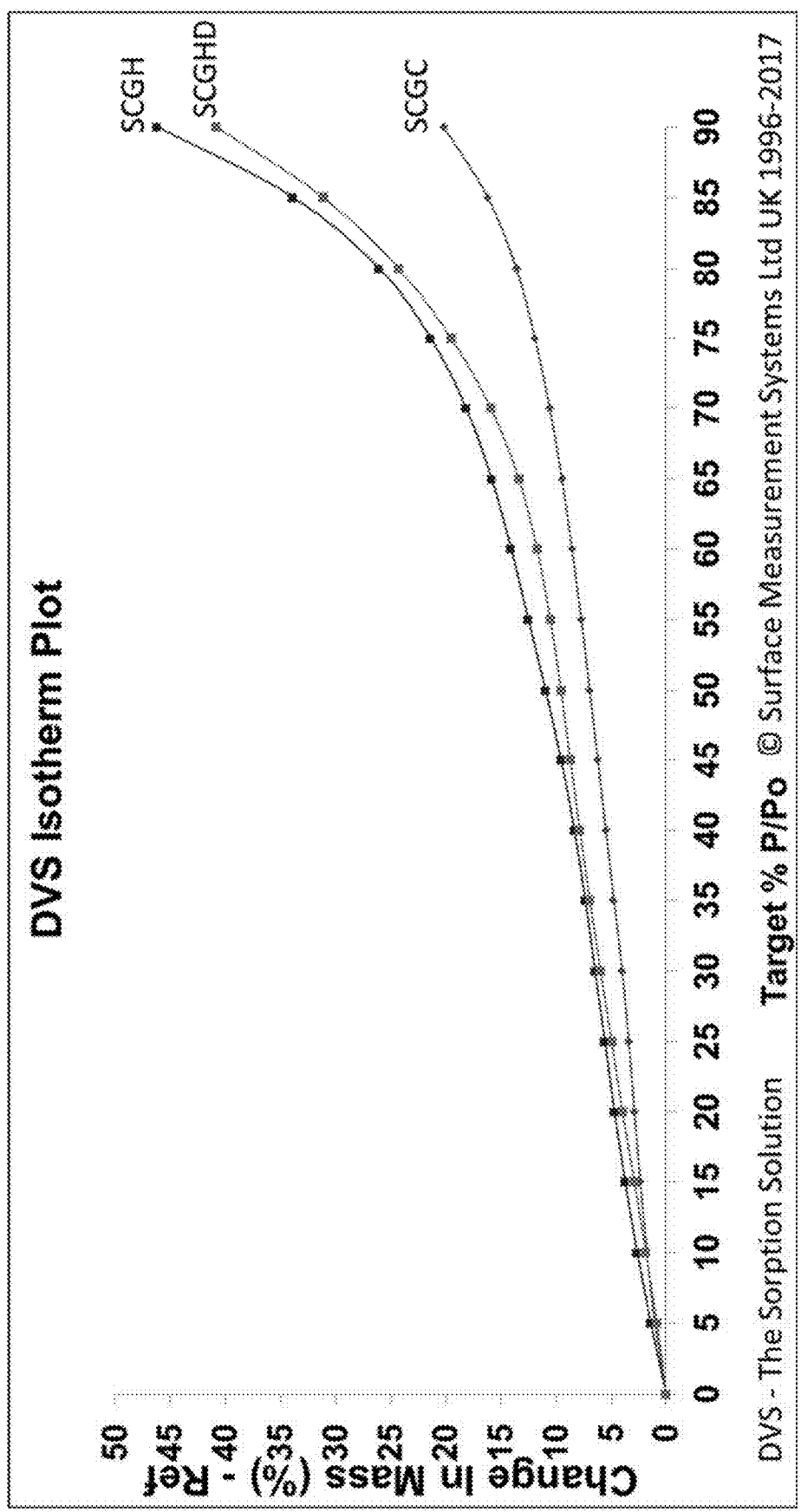
FIG. 4 is a water vapor sorption kinetic plot for insoluble holocellulose after AHP treatment, hemicellulose and defatted hemicellulose fractions isolated from SCG after AHP treatment at 25.0° C.

Moreover, insoluble holocellulose produced from the methods of the disclosure is white in color, without smoky off-note, and shows great stability in thermal (stable below 150° C.) and DVS experiments (stable below 80% RH) (FIG. 4). These characteristics make holocellulose from SCG have great potential applications in food industry as well, such as an ideal natural derived flow agent.

The total recovery of the hemicellulose rich extract and holocellulose constitutes over 60% of the dry weight of SCG by using the methods of the disclosure. As such, the methods of the disclosure provide an efficient and cost-effective method to extract hemicellulose rich extract as well as a clean insoluble holocellulose from SCG, which provide a very promising strategy for recycling SCG.

EXAMPLES

The following examples have been included to illustrate the presently disclosed subject matter. Certain aspects of the following examples are described in terms of techniques and procedures found or contemplated by the present inventors to work well in the practice of the presently disclosed subject matter. These examples illustrate standard practices of the inventors. In light of the present disclosure and the general level of skill in the art, those of skill will appreciate that the following examples are intended to be exemplary only and that numerous changes, modifications, and alterations can be employed without departing from the scope of the presently disclosed subject matter.

Example 1

Process of extraction of spend coffee grounds (SCG) hemicellulose using ethanol precipitation step only.
1. Defat
SCG 50 g was extracted using 250 mL of 70% ethanol aqueous solution two times, every time 6 hours.
2. Alkaline Hydrogen Peroxide Treatment
After dried in room temperature and grounded, the defat SCG was added to 400 mL of water to make a slurry. 20 mL of 30% $H_2O_2$ and 7 g of NaOH pellets were added to the slurry. The mixture was heated to 50° C. and stirred for 12 hours.
3. Separation
The solid and liquid fractions of the AHP treated slurry were separated by using a Beckman Coulter's Allegra X-30 benchtop centrifuge at a speed of 4800 rpm. About 400 mL of distilled water was used to rinse the solid so as to recover the liquid residue, which was combined with the supernatant from the centrifuge.
4. Concentrating
The liquid was concentrated by using vacuum rotavapor to remove about 70% of the water.
5. Acidification
About 5 mL of 37% HCl was added to the concentrated liquid to adjust the pH to about 5.6.
6. Precipitation
About three volumes of 75% ethanol was added to the acidified and concentrated solution. 3 hours later, a brown gum was precipitated, which was collected and washed with 70% ethanol three times, with 20 mL each time.
7. Drying
The hemicellulose gum was dried in an oven at 60° C. for 4 hours and ground into a brown colored powder. The total yield is 15% base on dry weight.

Example 2

Process of extraction and purification of spend coffee ground (SCG) hemicellulose and holocellulose using ethanol precipitation followed by membrane filtration.
1. Defat
No defat process.
2. Alkaline Hydrogen Peroxide Treatment
400 g of wet SCG with moisture of 52% was ground and added to 1.8 L of water to make a slurry. 130 mL of 30% $H_2O_2$ and 30 g of NaOH pellets were added to the slurry. The mixture was heated to 50° C. and stirred for 6 hours.
3. Separation
The solid and liquid fractions of the AHP treated slurry were separated using the separation procedure described in Example 1.
4. Concentrating
The liquid was concentrated by using vacuum rotavapor to remove about 70% of the water. The pH was adjusted to about 8.0 before concentration.
5. Acidification
37% HCl was added to the concentrated liquid to adjust the pH at about 5.0.

6. Precipitation

The hemicellulose gum was precipitated by using the same procedure described in Example 1.

7. Drying

The hemicellulose gum was freeze dried and ground into powder form. A total of 23% yield was achieved based on dry weight.

8. Secondary Purification Using Membrane Filtration.

A portion of the above hemicellulose gum was dissolved in water and subjected to nanofiltration using a membrane having a MWCO of 200 Da and ultrafiltration using a membrane having a MWCO of 5 kDa.

9. Drying

The resultant two retentates were freeze dried, with yields of 6.5% and 60%, respectively, based on the 20 g hemicellulose used.

Example 3

Process of extraction and purification of spend coffee ground (SCG) hemicellulose and holocellulose using nanofiltration followed by ethanol precipitation.

Hemicellulose gum was obtained using the same procedure 1-7 as describe in Example 2.

8. Secondary Purification Using Chromatography.

10 g of the hemicellulose gum was dissolved in water and loaded onto a macropore resin SP70 column for separation, using EtOH/$H_2O$ gradient, to give four fractions with yield of 56%, 16%, 12% and 10% respectively, based on the 10 g of hemicellulose gum used. Among these fractions, fractions 1 to 3 are hemicellulose rich fractions, fraction 4 contains more small molecule impurities.

9. Drying

The collected fractions were concentrated by vacuum rotavapor and freeze dried.

Example 4

Process of extraction of spend coffee ground (SCG) hemicellulose using nanofiltration followed by ethanol precipitation.

1. Defat

No defat process.

2. Alkaline Hydrogen Peroxide Treatment 6000 g of wet SCG with moisture of 60% was ground and added to 20 L of water to make a slurry. 800 g of 50% NaOH solution was added to the slurry. After one hour, 1600 g of 30% $H_2O_2$, was slowly added to the alkaline slurry. The mixture was heated to 70° C. and stirred for 6 hours.

3. Separation

The solid and liquid fractions of the AHP treated slurry were separated by 10 micron filtration bags. At least 10 L of distilled water was used to rinse the solid and recover the liquid residue, which was combined with the liquid filtrate.

4. Concentrating

The resultant liquid fraction was concentrated by using nanofiltration with MWCO of 200 kDa. Nearly 70% of water and 90% of sodium was removed.

5. Acidification

37% HCl was added to the concentrated liquid to adjust the pH to about 5.0.

6. Precipitation

About three volumes of 75% ethanol was added to the acidified and concentrated solution. 12 hours later, a brown gum was precipitated, which was collected and washed with 75% ethanol three times, with 500 mL each time.

7. Drying

The hemicellulose gum was dried at room temperature in a fume hood and ground into a brown colored powder. The total yield was 20% based on the dry weight of SCG used.

Example 5

Process of extraction of spend coffee ground (SCG) hemicellulose using membrane filtration only.

1. Defat

No defat process.

2. Alkaline Hydrogen Peroxide Treatment

An AHP pretreatment procedure was carried out in the same manner as step 2 in Example 2.

3. Separation

The solid and liquid fractions of the AHP treated slurry were separated by using the separation procedure in Example 1.

4. Concentrating

No concentrating step.

5. Acidification

37% HCl was added to the liquid fraction to adjust the pH to a value of about 7.0.

6. Membrane Filtration

The neutralized solution was filtrated by ultrafiltration using a MWCO of 5 kDa.

7. Drying

The resultant retentates were freeze dried into brown powder. Total recovered hemicellulose was 27%, based on dry weight of SCG used.

Example 6

Process of extraction of spend coffee ground (SCG) defatted hemicellulose—defat step before precipitation.

Steps 1-5 are the same as described in Example 4.

An equal volume of ethyl acetate was added to the acidified and concentrated solution. The solution was then mixed well by shaking, after which the upper organic phase was removed, and the water phase was collected, providing a neutralized solution. The neutralized solution was filtrated by ultrafiltration using MWCO of 5 kDa.

1. Precipitation

Precipitation was performed according to step 6 in Example 4.

2. Drying

Drying was performed according to step 7 in Example 4. The total yield of the defat hemicellulose extract was 16%, based on the dry weight of SCG used.

Example 7

Process of extraction of spend coffee ground (SCG) defatted hemicellulose—defat step after precipitation.

Steps 1-6 are the same as described in Example 4.

1. The hemicellulose gum is dissolved in water to make a 20% solution.
2. An equal volume of ethyl acetate was added to the water solution. The solution was then mixed well by shaking, after which the upper organic phase was removed, and the water phase was collected.
3. The water of the water phase was removed by rotavapor at 70° C. The solid is ground into powder form. The total yield of the defat hemicellulose extract was 15% based on dry weight of SCG used.

What is claimed is:

1. A method of producing a hemicellulose product, the method comprising:
   treating an aqueous slurry of spend coffee grounds with an alkaline hydrogen peroxide solution;
   separating a solid fraction from a liquid fraction of the alkaline hydrogen peroxide treated slurry;
   adjusting the pH of the liquid fraction to a pH between about 4.0-6.0 using a pH adjusting agent;
   combining an alcohol solution with the pH adjusted liquid fraction so as to precipitate a hemicellulose product; and
   drying the hemicellulose product.

2. The method of claim 1, further comprising a step of defatting the aqueous slurry by adding an organic solvent to the aqueous slurry prior to the step of adding an alkaline hydrogen peroxide solution.

3. The method of claim 1, further comprising a step of concentrating the liquid fraction.

4. The method of claim 3, wherein the concentrating step is carried out using a vacuum rotavapor.

5. The method of claim 3, wherein the concentrating step is carried out by membrane filtration.

6. The method of claim 3, further comprising a step of purifying the dried hemicellulose product.

7. The method of claim 6, wherein the step of purifying the dried hemicellulose product comprises steps of dissolving the dried hemicellulose product in an aqueous solution and purifying the dissolved hemicellulose product by membrane filtration.

8. The method of claim 6, wherein the step of purifying the dried hemicellulose product comprises steps of dissolving the dried hemicellulose product in an aqueous solution and purifying the dissolved hemicellulose product by column chromatography.

9. The method of claim 3, further comprising a defatting step by adding an organic solvent to the concentrated pH adjusted solution prior to the step of precipitating the hemicellulose product.

10. The method of claim 3, further comprising:
    dissolving the precipitated hemicellulose product in an aqueous solution;
    adding an organic solvent to the hemicellulose aqueous solution so as to remove fat from the solution; and
    drying the defatted hemicellulose product.

11. The method of claim 1, further comprising a step of purifying the dried hemicellulose product.

12. The method of claim 11, wherein the step of purifying the dried hemicellulose product comprises steps of dissolving the dried hemicellulose product in an aqueous solution and purifying the dissolved hemicellulose product by membrane filtration.

13. The method of claim 11, wherein the step of purifying the dried hemicellulose product comprises steps of dissolving the dried hemicellulose product in an aqueous solution and purifying the dissolved hemicellulose product by column chromatography.

14. The method of claim 1, wherein ethanol is the alcohol solution combined with the pH adjusted liquid fraction to precipitate the hemicellulose product.

15. The method of claim 1, wherein the hemicellulose product has a molecular weight of about 2 kDa to about 200 kDa.

16. The method of claim 15, wherein the hemicellulose product comprises galactose in an amount of about 62%-94%, arabinose in an amount of about 9%-14%, and mannose in an amount of about 3.3%-5.1%.

17. The method of claim 1, further comprising, prior to combining the spend coffee grounds with the alkaline hydrogen peroxide solution, combining the spend coffee grounds with ethanol and water for a sufficient time to remove lipophilic and hydrophilic components from the spend coffee grounds.

18. The method of claim 1, further comprising recovering water insoluble fibers from the solid fraction.

19. The method of claim 18, wherein the water insoluble fibers are delignified and decolored.

20. The method of claim 1, wherein the alkaline hydrogen peroxide solution is added in the treating step such that an amount of hydrogen peroxide added is 1-5% w/w based on a total weight of the aqueous slurry.

21. A method of producing a hemicellulose product, the method comprising:
    treating an aqueous slurry of spend coffee grounds with an alkaline hydrogen peroxide solution;
    separating a solid fraction from a liquid fraction of the alkaline hydrogen peroxide treated slurry;
    concentrating the liquid fraction by membrane filtration;
    adjusting the pH of the concentrated liquid fraction to a pH between about 4.0-6.0 using a pH adjusting agent;
    precipitating a hemicellulose product by adding ethanol to the pH adjusted solution; and
    drying the hemicellulose product.

22. The method of claim 21, wherein the alkaline hydrogen peroxide solution is added in the treating step such that an amount of hydrogen peroxide added is 1-5% w/w based on a total weight of the aqueous slurry.

* * * * *